(12) United States Patent
Bowden

(10) Patent No.: US 11,629,651 B2
(45) Date of Patent: Apr. 18, 2023

(54) GAS TURBINE ENGINE HAVING A TURBOMACHINE AND AN ELECTRIC MOTOR COUPLED TO A PROPELLER

(71) Applicant: General Electric Company, Schenectady, NY (US)

(72) Inventor: William Joseph Bowden, Fairfield, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/950,099

(22) Filed: Nov. 17, 2020

(65) Prior Publication Data

US 2022/0154651 A1      May 19, 2022

(51) Int. Cl.
| | |
|---|---|
| *F02C 9/18* | (2006.01) |
| *F02C 3/13* | (2006.01) |
| *F02C 6/20* | (2006.01) |
| *B64D 27/02* | (2006.01) |

(52) U.S. Cl.
CPC ............... *F02C 9/18* (2013.01); *F02C 3/13* (2013.01); *F02C 6/206* (2013.01); *B64D 2027/026* (2013.01); *F05D 2220/323* (2013.01)

(58) Field of Classification Search
CPC .... F02C 7/042; F02C 7/04; F02C 9/16; F02C 9/20
See application file for complete search history.

(56) References Cited

U.S. PATENT DOCUMENTS

| | | | | |
|---|---|---|---|---|
| 3,618,876 A | * | 11/1971 | Skidmore | F02C 7/042 244/53 B |
| 3,779,010 A | * | 12/1973 | Chamay | F02K 1/09 60/226.2 |
| 6,634,595 B2 | * | 10/2003 | Koncsek | B64D 33/02 137/15.1 |
| 8,434,724 B2 | | 5/2013 | Chelin et al. | |
| 8,727,267 B2 | * | 5/2014 | Jain | F02C 7/057 244/53 B |
| 8,757,319 B2 | | 6/2014 | Bouteiller et al. | |
| 8,844,553 B2 | | 9/2014 | Zysman et al. | |
| 9,027,884 B2 | | 5/2015 | Valleroy et al. | |
| 9,157,368 B2 | | 10/2015 | Hurwitz et al. | |
| 9,789,954 B2 | | 10/2017 | Kestler et al. | |
| 9,862,482 B2 | | 1/2018 | Huynh et al. | |
| 2008/0308684 A1 | * | 12/2008 | Chaudhry | F02C 7/042 244/53 B |
| 2011/0167791 A1 | * | 7/2011 | Johnson | F02K 3/077 60/226.3 |
| 2017/0284296 A1 | * | 10/2017 | Nestico | F02C 7/057 |

(Continued)

OTHER PUBLICATIONS

Colorado State University, "Stoichiometry" https://web.archive.org/web/20170425071901/https://www.engr.colostate.edu/~allan/thermo/page9/page9.html (Year: 2017).*

*Primary Examiner* — Todd E Manahan
*Assistant Examiner* — Thuyhang N Nguyen
(74) *Attorney, Agent, or Firm* — Dority & Manning, P.A.

(57) ABSTRACT

A gas turbine engine including: a turbomachine coupled to a propeller of the gas turbine engine, the turbomachine being in fluid communication with an external environment through an air inlet; and an electric motor coupled to the propeller, wherein the air inlet is in fluid communication with a bypass duct having a selectively variable geometry.

18 Claims, 8 Drawing Sheets

(56) References Cited

U.S. PATENT DOCUMENTS

| | | | |
|---|---|---|---|
| 2017/0284297 A1* | 10/2017 | Nestico | F02C 3/04 |
| 2018/0009536 A1* | 1/2018 | Christopherson | F02C 3/04 |
| 2020/0158213 A1* | 5/2020 | Leque | F02C 3/113 |
| 2021/0179282 A1* | 6/2021 | Venter | F01D 15/10 |

* cited by examiner

# GAS TURBINE ENGINE HAVING A TURBOMACHINE AND AN ELECTRIC MOTOR COUPLED TO A PROPELLER

FIELD

The present subject matter relates generally to gas turbine engines, and more particularly to hybrid electric gas turbine engines.

BACKGROUND

Gas turbine engines generally utilize a gas turbine to generate thrust. Exemplary gas turbine engines include gas turbines and turbofans which utilize gas turbines to power propellers. The gas turbine is disposed in fluid communication with an air inlet of the gas turbine engine through an air passageway. Air passes through the air passageway to the gas turbine where combustion generates power which is transmitted to the propeller through a drive shaft.

Industry demand warrants the use of hybrid electric gas turbine engines. However, such configurations have several drawbacks, including reduced aerodynamic performance as a result of existing design limitations. Accordingly, an improved hybrid electric gas turbine engine would be useful.

BRIEF DESCRIPTION

Aspects and advantages of the invention will be set forth in part in the following description, or may be obvious from the description, or may be learned through practice of the invention.

In one exemplary embodiment of the present disclosure, A gas turbine engine comprising: a propeller; a turbomachine coupled to the propeller, the turbomachine being in fluid communication with an external environment through an air inlet; and an electric motor coupled to the propeller, wherein the air inlet is in fluid communication with a bypass duct having a selectively variable geometry.

According to another exemplary embodiment, a hybrid electric gas turbine engine comprising: an electric motor configured to selectively drive a propeller of the gas turbine engine when a secondary drive element of the hybrid electric gas turbine engine is operating at a reduced capacity; and an adjustable element configured to increase a fluid volumetric flow rate capability of a bypass duct when the electric motor is active.

According to another exemplary embodiment, a method of using a gas turbine engine, the method comprising: driving a propeller of the gas turbine engine using a turbomachine; switching from the turbomachine to an electric motor for driving the propeller; and increasing an opening size of a bypass duct of the gas turbine engine to increase volumetric flow rate of air through the bypass duct when the electric motor is active.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
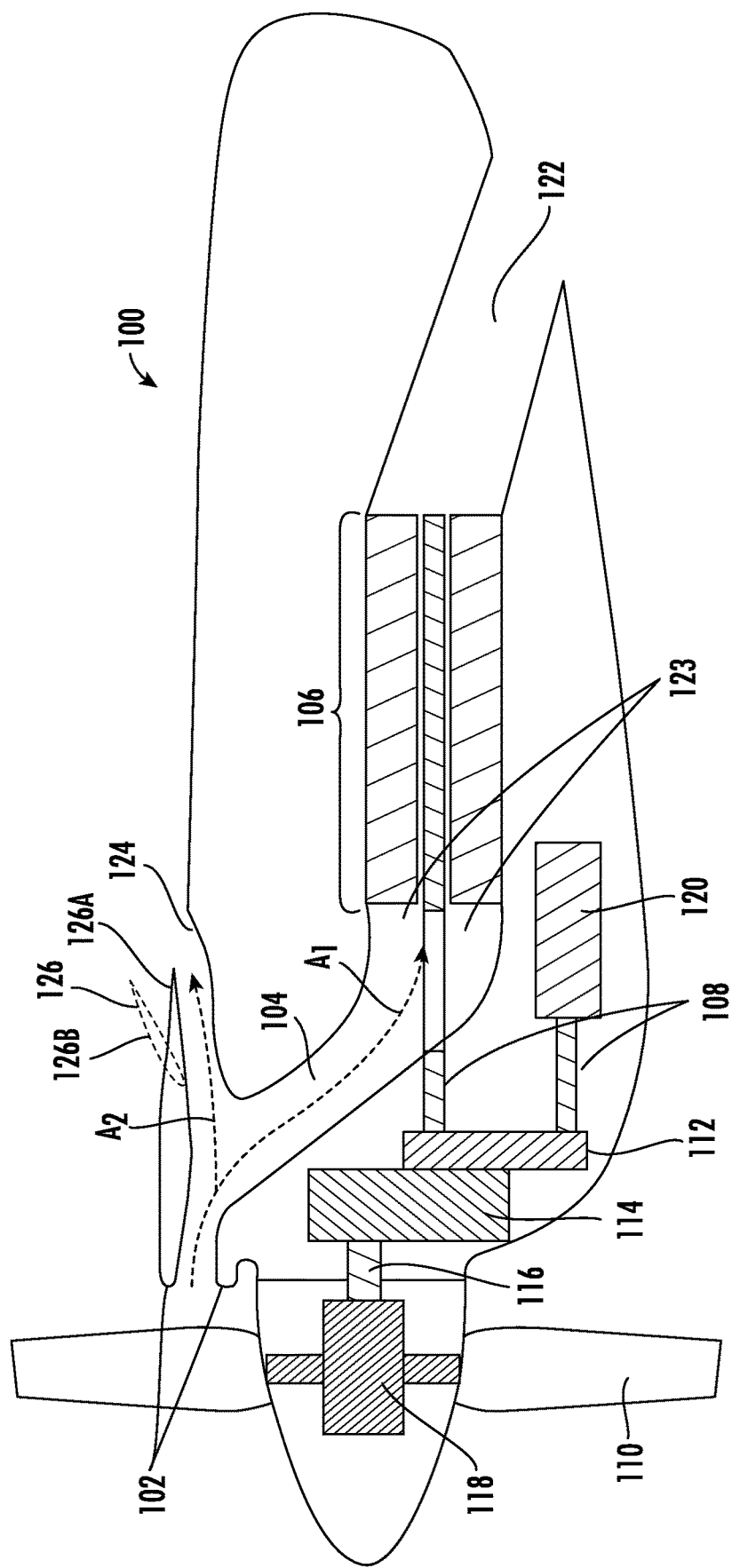
FIG. 1 is a schematic, cross-sectional side view of a gas turbine engine in accordance with an exemplary embodiment of the present disclosure.

Repeat use of reference characters in the present specification and drawings is intended to represent the same or analogous features or elements of the present invention.

DETAILED DESCRIPTION

Reference now will be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In accordance with one or more embodiments of the present disclosure, a gas turbine engine can operate using a turbomachine and/or an electric motor. When operating using the turbomachine, air passes through an air inlet and is directed to the turbomachine to generate combustion. When operating using the electric motor, the turbomachine is no longer forcibly drawing air from the air inlet at the same volumetric flow rate, resulting in the increase of back pressure at the air inlet. Accordingly, an adjustable element located in a bypass duct of the gas turbine engine can be manipulated to reduce the incurrence of back pressure by increasing a fluid volumetric flow rate capability of the bypass duct. By enlarging the bypass duct, back pressure can be reduced, resulting in improved aerodynamics and operational stability of the gas turbine engine.

In certain instances, the gas turbine engine may be part of an aircraft, such as an airplane or other aerial vehicle. In other instances, the gas turbine engine may be part of a land-based vehicle or other land-based structure. An exemplary gas turbine engine in accordance with one or more embodiments herein includes a turboprop engine.

Referring to the figures, FIG. 1 illustrates a schematic, cross-sectional view of an exemplary gas turbine engine 100 in accordance with one or more embodiments of the present invention. The gas turbine engine 100 can be a hybrid electric engine configured to generate power using one or both of a gas turbine engine (referred to herein as a gas turbine) and/or an electric motor. Accordingly, the gas turbine engine 100 can operate using one of three means of power generation—combustion of fuel and oxygen in the gas turbine to generate shaft power to turn a propeller; use of electrical power, either from battery storage or generated separately from the propulsion system, to power an electrically-driven motor that turns the propeller; or using a combination of electrical and combustion power whereby the gas turbine and electric motor are operating concurrently. During concurrent usage of the electric motor and gas turbine, both power generation means can be operated at reduced loading, i.e., operated at partial power. As such, fuel efficiency of the gas turbine engine can be increased.

The gas turbine engine 100 can generally include an air inlet 102 in fluid communication with an external environment, e.g., air surrounding the gas turbine engine 100. The air inlet 102 may be defined by a nacelle of the gas turbine engine 100. As the gas turbine engine 100 travels through the external environment, the air inlet 102 can act like a scoop, directing air $A_1$ along an air passageway 104 to a turbomachine 106. Air $A_1$ entering the turbomachine 106 can be combined with a fuel supply and ignited to create combustion. The combustion generated by the turbomachine 106 can rotate a drive shaft 108 operably coupled to a propeller 110 of the gas turbine engine 100. In the illustrated embodiment, the drive shaft 108 is connected to the propeller 110 through a combining gearbox (CGB) 112 and a reduction or propeller gearbox (PGB) 114 which outputs a rotational biasing force to the propeller 110 through a downstream drive shaft 116. A pitch change mechanism (PCM) 118 is shown coupled between the downstream drive shaft 116 and the propeller 110. The PCM 118 can adjust a relative pitch of one or more propeller blades of the propeller 110, adjusting the force generated per revolution of the propeller 110.

The gas turbine engine 100 further includes an electric motor 120 which electrically powered from battery storage (not shown) or generated by a separate propulsion system (not shown). The electric motor 120 can generate rotational energy in the drive shaft 108 which is transmitted through the CGB 112 and PGB 114 to output rotational biasing force to the propeller 110 through the downstream drive shaft 116.

When the gas turbine engine 100 is operating using the electric motor 120, alone or in combination with the turbomachine 106, the air inlet 102 of the gas turbine engine 100 may appear to be effectively oversized relative to the air requirement of the turbomachine 106 operating at a reduced capacity or being inactive altogether. That is, as the electric motor 120 generates increased power to the drive shaft 108, the power generation requirement of the turbomachine 106 is inversely reduced. Accordingly, air flow requirements to the turbomachine 106 are effectively reduced. Moreover, air flow resistance through the turbomachine 106 to an exhaust 122 of the gas turbine engine 100 created by a lack of drawing (negative) pressure at the combustor inlet 123 of the turbomachine 106 can create a back pressure within the air passageway 104. The resulting back pressure in the air passageway 104 can manifest at the air inlet 102, creating reduced aerodynamic performance of the gas turbine engine 100. Specifically, back pressure at the air inlet 102 can affect propeller blade efficiency and loading every time a propeller blade passes in front of the non- or low-flowing air inlet 102. In the case of a propeller 110 having six blades, for example, every rotation of the propeller 110 can result in six individual pulses of inefficient loading. This unsteady loading can affect integrity and lifespan of the propeller blades as well as the PGB 114 and other components of the gas turbine engine 100. Additionally, overall aircraft performance (e.g., speed, fuel efficiency, electric motor wear, and the like) can be affected.

The gas turbine engine 100 can further include a bypass duct 124. The bypass duct 124 can be in fluid communication with the air inlet 102. The bypass duct 124 can be disposed downstream of the air inlet 102 such that air entering the air inlet 102 can pass through the gas turbine engine 100 through the bypass duct 124. In the illustrated embodiment, the bypass duct 124 is further located downstream of the air passageway 104 leading to the turbomachine 106. In certain instances, the bypass duct 124 can include a foreign-object debris passageway, an air bypass, or another air passageway through the gas turbine engine 100. In an embodiment, the bypass duct 124 can be sized to accommodate bird strikes which may occur when a bird gets ingested into the gas turbine engine 100.

When the turbomachine 106 is operating at reduced capacity, or inactive altogether, it is desirable to reroute airflow from path $A_1$ to an alternate, or secondary, airflow path, such as airflow path $A_2$ through the bypass duct 124, so that back pressure generated in the air passageway 104 is reduced, thereby mitigating or reducing unwanted airflow characteristics at the air inlet 102 which can affect performance. However, use of the bypass duct 124 must also account for instances where high volumes of airflow through the air passageway 104 is desired, e.g., when the turbomachine 106 is operated at high, or full, power.

In accordance with one or more embodiments described herein, a fluid volumetric flow rate capacity of the bypass duct 124 can be adjusted using an adjustable element 126 in fluid communication with the bypass duct 124. As used herein, fluid volumetric flow rate capacity refers to the relatively capability of volumetric flow rate for a given orifice or passageway. High fluid volumetric flow rate capacities may be indicative, for example, of passageways with greater areal dimensions, thus allowing a greater volumetric flow rate and less restricted fluid passage therethrough. Conversely, low fluid volumetric flow rate capacities may indicate relatively restricted openings which cannot pass relatively high volumetric flow rates therethrough.

The adjustable element 126 may control, or at least partially control, the fluid volumetric flow rate capacity of the bypass duct 124 using variable geometry. For example, referring still to FIG. 1, the adjustable element 126 can include a rotatable element configured to rotate between one or more rotatable orientations. In the illustrated embodiment, for example, the adjustable element 126 can be pivoted between a stowed configuration 126A with a relatively low fluid volumetric flow rate capacity and a deployed position 126B with a relatively high fluid volumetric flow rate capacity. By way of example, the bypass duct can define a first volumetric flow rate capability when the electric motor 120 is active and a second fluid volumetric flow rate capability when the electric motor is inactive, where the first and second fluid volumetric flow rates are different from one another. In a particular embodiment, the first fluid volumetric flow rate capability can be higher than the second fluid volumetric flow rate capability. By way of example, the first fluid volumetric flow rate capability can be at least 101% the second fluid volumetric flow rate capability, such as at least 102% the second fluid volumetric flow rate capability, such as at least 103% the second fluid volumetric flow rate capability, such as at least 104% the second fluid volumetric flow rate capability, such as at least 105% the second fluid volumetric flow rate capability, such as at least 110% the second fluid volumetric flow rate capability, such as at least 115% the second fluid volumetric flow rate capability, such as at least 120% the second fluid volumetric flow rate capability, such as at least 125% the second fluid volumetric flow rate capability, such as at least 130% the second fluid volumetric flow rate capability, such as at least 135% the second fluid volumetric flow rate capability, such as at least 140% the second fluid volumetric flow rate capability, such as at least 145% the second fluid volumetric flow rate capability, such as at least 150% the second fluid volumetric flow rate capability, such as at least 155% the second fluid volumetric flow rate capability, such as at least 160% the second fluid volumetric flow rate capability, such as at least 165% the second fluid volumetric flow rate capability, such as at least 170% the second fluid volumetric flow rate capability, such as at least 175% the second fluid volumetric flow rate capability, such as at least 180% the second fluid volumetric flow rate capability, such as at least 185% the second fluid volumetric flow rate capability, such as at least 190% the second fluid volumetric flow rate capability, such as at least 195% the second fluid volumetric flow rate capability, such as at least 200% the second fluid volumetric flow rate capability, such as at least 250% the second fluid volumetric flow rate capability, such as at least 300% the second fluid volumetric flow rate capability, such as at least 350% the second fluid volumetric flow rate capability, such as at least 400% the second fluid volumetric flow rate capability.

As the fluid volumetric flow rate capability of the bypass duct 124 increases, the relative amount of backpressure of the propeller 110 can decrease as air passing through the air inlet 102 seeks a path of least resistance which correlates with flowpath $A_2$. In certain instances, the relative volumetric flow rates of air along flowpaths $A_1$ and $A_2$ can be inversely related. In a more particular instance, the relative volumetric flow rates of airpaths $A_1$ and $A_2$ can be exactly inversely related. That is, as the volumetric flow rate along flowpath $A_1$ decrease by a prescribed amount, the volumetric flow rate along flowpath $A_2$ can increase by the same prescribed amount.

In an embodiment, the adjustable element 126 can be adjustable through a manual user interface. The user can thus selectively adjust the relative position of the adjustable element 126 in view of demands of the gas turbine engine 100. In certain instances, the gas turbine engine 100 can provide the user with a display indicating a desirable position, or range of positions, to which the adjustable element should be moved to in view of current airflow demand. In another embodiment, the adjustable element 126 can be controlled by one or more processors configured to detect (e.g., sense) required airflow demands and automatically, or partially automatically, adjust the relative position of the adjustable element 126. In yet another embodiment, the adjustable element 126 can be controlled by one or more mechanical elements (e.g., linkages) configured to detect the presence of, e.g., backpressure of the propeller 110, and mechanically balance the airflow paths as necessary. Other arrangements for adjustment of the adjustable element 126 can exist and are not limited to those described above.

As described above, the adjustable element 126 can be rotatable to adjust the relative geometry of the bypass duct 124. In an embodiment, the adjustable element 126 can be rotatable by at least 1° between the stowed and deployed positions 126A and 126B, such as by at least 2° between the stowed and deployed positions 126A and 126B, such as by at least 3° between the stowed and deployed positions 126A and 126B, such as by at least 4° between the stowed and deployed positions 126A and 126B, such as by at least 5° between the stowed and deployed positions 126A and 126B, such as by at least 7.5° between the stowed and deployed positions 126A and 126B, such as by at least 10° between the stowed and deployed positions 126A and 126B, such as by at least 15° between the stowed and deployed positions 126A and 126B, such as by at least 20° between the stowed and deployed positions 126A and 126B, such as by at least 25° between the stowed and deployed positions 126A and 126B, such as by at least 30° between the stowed and deployed positions 126A and 126B, such as by at least 35° between the stowed and deployed positions 126A and 126B, such as by at least 40° between the stowed and deployed positions 126A and 126B, such as by at least 45° between the stowed and deployed positions 126A and 126B. In certain instances, the rotatable adjustable element 126 can be rotatable between a preset number of rotatable positions. For example, the rotatable adjustable element 126 can be rotated between two preset positions, three preset positions, four preset positions, five present positions, and so on. In other instances, the rotatable adjustable element 126 can be infinitely rotatable within a maximum prescribed range of rotational positions. In this regard, the rotatable adjustable element can be set to any angular position within the maximum prescribed range.

Figure 2:
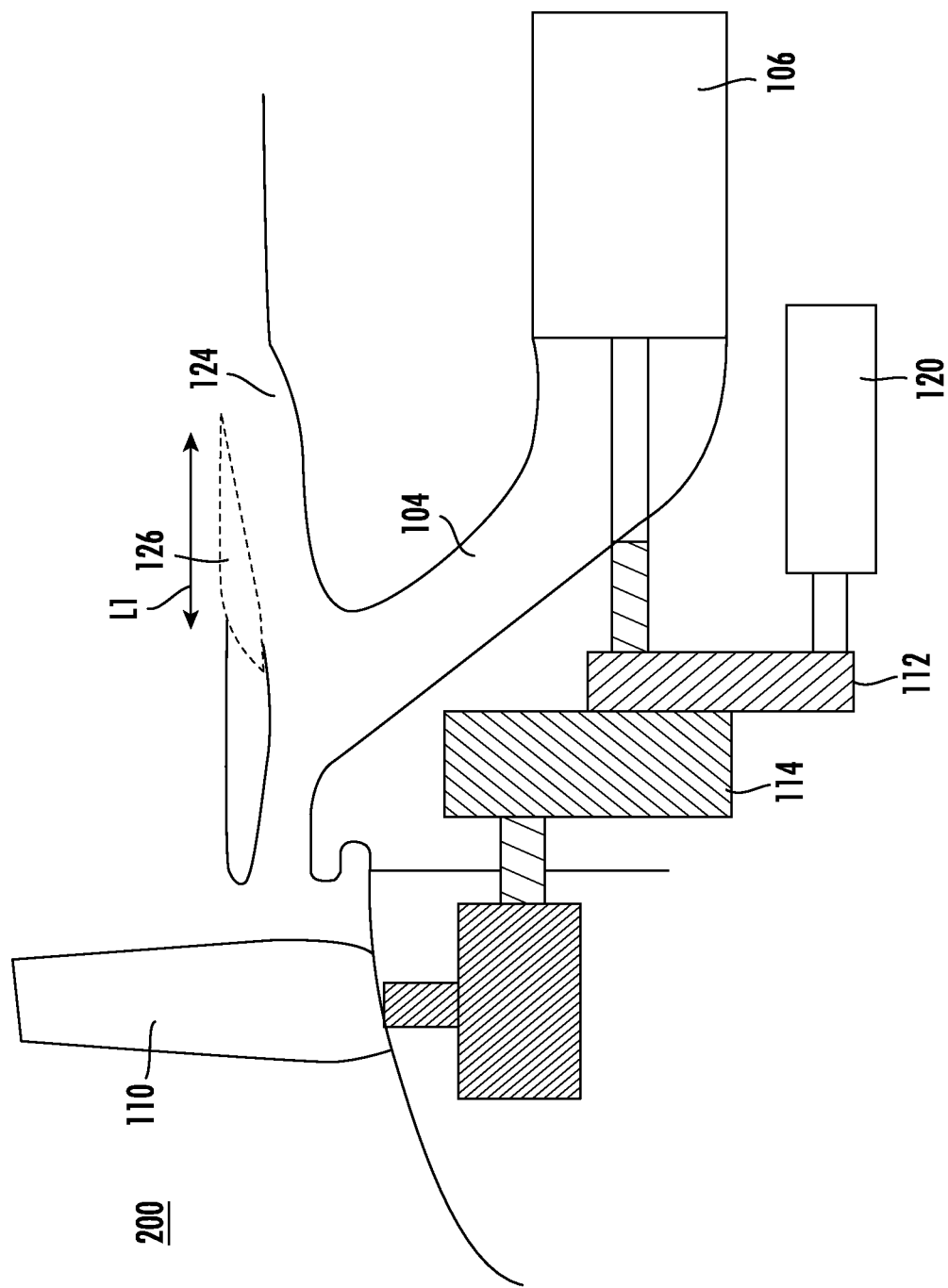
FIG. 2 is a partial, schematic, cross-sectional side view of a gas turbine engine in accordance with an exemplary embodiment of the present disclosure.
Figure 3:
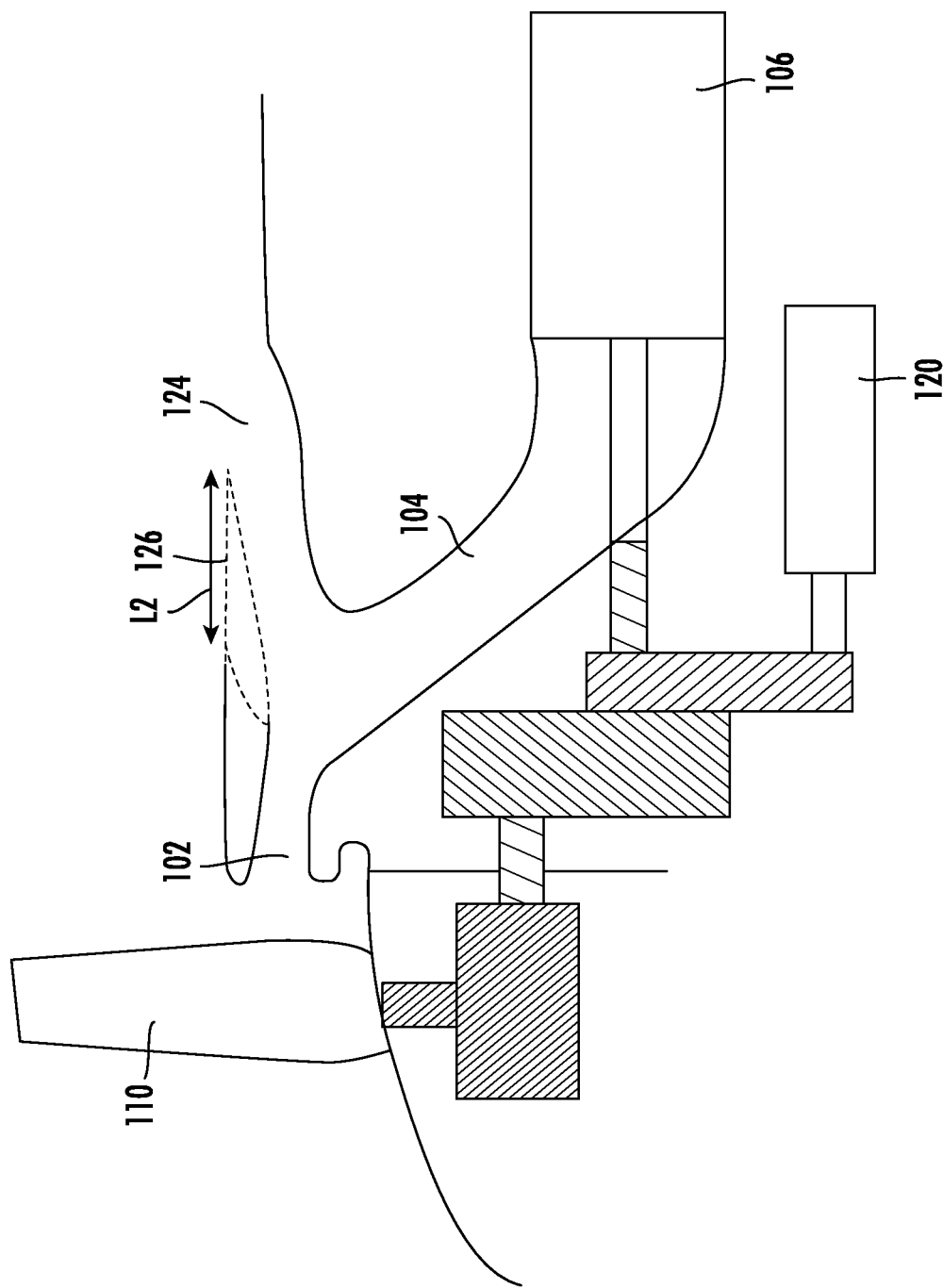
FIG. 3 is a partial, schematic, cross-sectional side view of a gas turbine engine in accordance with an exemplary embodiment of the present disclosure.

FIGS. 2 and 3 illustrate partial, schematic, cross-sectional views of a gas turbine engine 200 in accordance with another embodiment. The gas turbine engine 200 can have any number of similar or different features or characteristics as described with respect to the gas turbine engine 100. For example, the gas turbine engine 200 can include a turbomachine 106 and an electric motor 120 both operably coupled to a propeller 110 through drive shaft(s) 108, a CGB 112 and a PGB 114.

In the embodiment illustrated in FIGS. 2 and 3, the adjustable element 126 comprises a translatable adjustable element configured to translate between two or more translatably offset positions. As shown in FIG. 2, the adjustable element 126 can define a length, L1, as measured between a forward-most exposed location of the adjustable element 126 and a rear-most location of the adjustable element 126. When the adjustable element 126 is arranged at length, L1, the fluid volumetric flow rate capability of the bypass duct 124 can more readily accommodate usage of the turbomachine 106. That is, fluid flow through the bypass duct 124 can be relatively restricted, resulting in a larger volumetric flow rate to the turbomachine 106.

As the gas turbine engine 200 is transitioned at least partially to relying on the electric motor 120 for power generation, the adjustable element 126 can translate towards a second position, illustrated in FIG. 3, defining a length, L2, as measured between a forward-most exposed location of the adjustable element 126 and a rear-most location of the adjustable element 126. The second position can be defined by a reduction in air flow through the air passageway 104 and a resulting increase in volumetric flow rate of air through the bypass duct 124. By way of example, L1 can be at least 101% L2, such as at least 102% L2, such as at least 103% L2, such as at least 104% L2, such as at least 105% L2, such as at least 106% L2, such as at least 107% L2, such as at least 108% L2, such as at least 109% L2, such as at least 110% L2, such as at least 115% L2, such as at least 120% L2, such as at least 125% L2, such as at least 130% L2, such as at least 135% L2, such as at least 140% L2, such as at least 145% L2, such as at least 150% L2, such as at least 155% L2, such as at least 160% L2, such as at least 165% L2, such as at least 170% L2, such as at least 175% L2, such as at least 180% L2, such as at least 185% L2, such as at least 190% L2, such as at least 195% L2, such as at least 200% L2.

Larger differences between L1 and L2 may account for greater flow rate variability between the first and second positions of the adjustable element 126. More specifically, gas turbine engines 200 having high variability between L1 and L2 may be configured to switch more fully between the turbomachine 106 and the electric motor 120. That is, for example, certain gas turbine engines 200 with high L1:L2 variability may be configured to operate using the electric motor 120 alone, i.e., without simultaneously using the turbomachine 106. The ability to adjust the adjustable element 126 by a large amount may be necessary to prevent back pressure build up and to maintain aerodynamic performance capabilities.

In certain instances, the first and second offset positions of the adjustable element 126 can be defined my translational movement only. In other instances, the first and second offset positions of the adjustable element 126 can be defined by rotational movement only. In yet other instances, the first and second offset positions of the adjustable element 126 can be defined by translational and rotational movement. It should be understood that other geometry varying movements can be employed to adjust the fluid volumetric air flow capacity of the bypass duct 124 in accordance with other embodiments.

Figure 4:
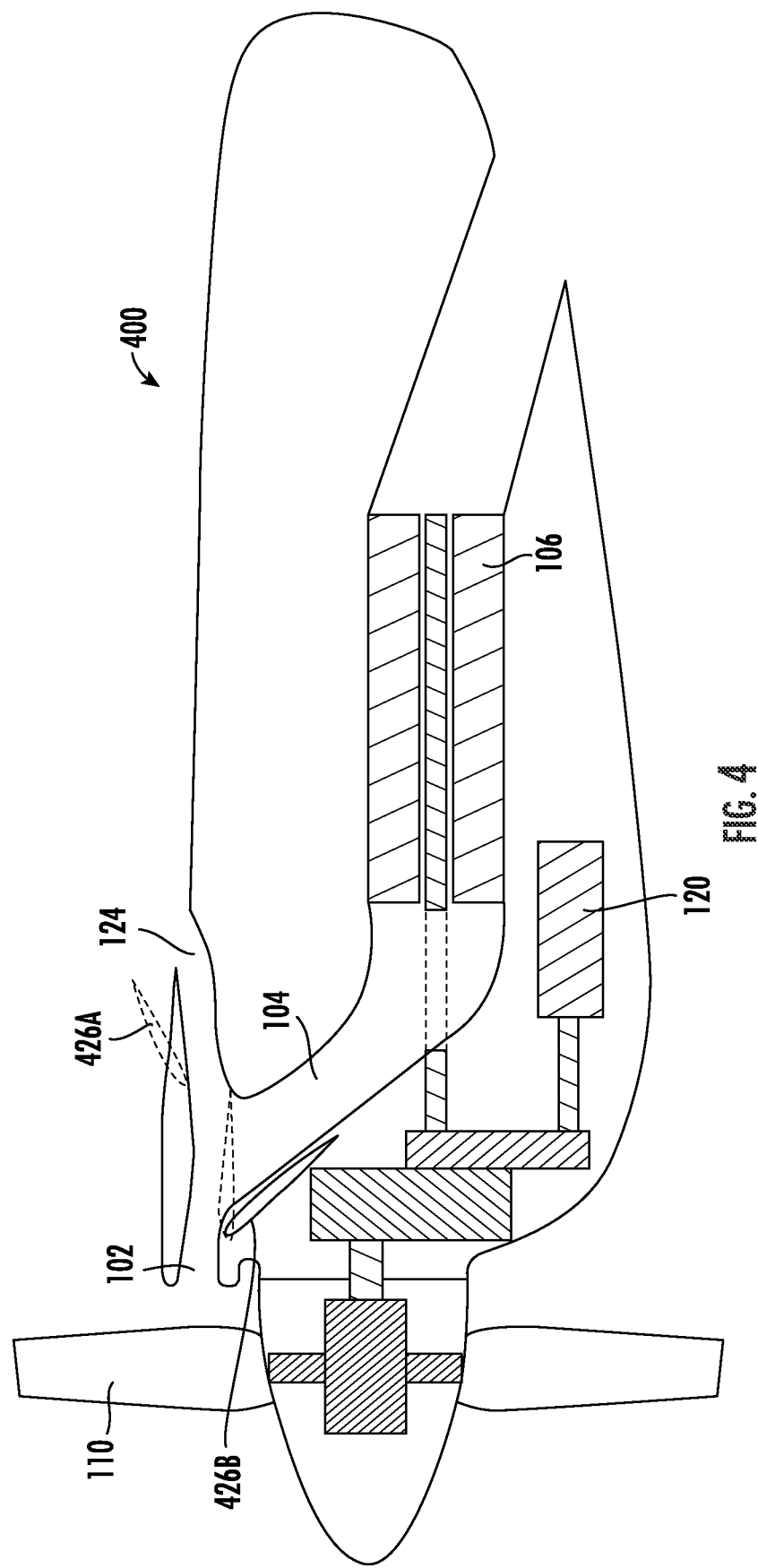
FIG. 4 is a schematic, cross-sectional side view of a gas turbine engine in accordance with an exemplary embodiment of the present disclosure

FIG. 4 illustrates another exemplary embodiment of a gas turbine engine 400. The gas turbine engine 400 includes a turbomachine 106, an electric motor 120, a propeller 110, an air passageway 104 extending from an area between an air inlet 102 and a bypass duct 124. The gas turbine engine 400 illustrates multi-variable geometry design whereby geometry of the air passageway 104 and bypass duct 124 are both selectively adjustable. By way of example, multi-variable geometry can be achieved using a plurality of adjustable elements (e.g., a plurality of adjustable elements 126). The plurality of adjustable elements can include at least two adjustable elements, at least three adjustable elements, at least four adjustable elements, at least five adjustable elements, and so on. In a particular embodiment, the plurality of adjustable elements can include two adjustable elements that are spaced apart from one another and configured to operate independently of one another, i.e., even though the adjustable elements may be operated in concert they can operate through independent controllers, motors, and the like to achieve desired air flow characteristics as needed.

The illustrated gas turbine engine 400 includes a first adjustable element 426A and a second adjustable element 426B. The first adjustable element 426A is disposed upstream of the bypass duct 124 and downstream of the air passageway 104. Meanwhile, the second adjustable element 426B is disposed upstream of the bypass duct 124 and configured to fluidly isolate, or at least reduce airflow to, the air passageway 104 from the air inlet 102. The adjustable elements 426A and 426B are both illustrated as being rotatably adjustable. In other embodiments, at least one of the adjustable elements 426A and 426B can be translationally adjustable or otherwise adjustable so as to control the volumetric fluid flow rate capacity of the bypass duct 124, the air passageway 104, another airflow passageway, or any combination thereof. The adjustable elements 426A and 426B can be adjustably linked, e.g., mechanically, electrically, or computationally, such that the adjustable elements 426A and 426B operate in concert to achieve a desired air flow characteristics for the gas turbine engine 400.

By way of example, in certain instances, the adjustable element 426A can be used to increase volumetric fluid flow rate capacity of the bypass duct 124 and the adjustable element 426B can be used to decrease volumetric fluid flow rate capacity of the air passageway 104 when the turbomachine 106 is not operating at full capacity, e.g., when the turbomachine 106 is inactive. By way of another example, the adjustable element 426A can be used to decrease volumetric fluid flow rate capacity of the bypass duct 124 and the adjustable element 426B can be used to increase volumetric fluid flow rate capacity of the air passageway 104 when the turbomachine 106 is being actively used, e.g., at full capacity.

In certain instances, the adjustable elements 426A and 426B can move the same, or similar, amounts between largest and smallest configurations, e.g., between maximum open and maximum closed positions. In other instances, the adjustable elements 426A and 426B can each be configured to move different amounts between largest and smallest configurations. For example, the adjustable element 426B may move from a fully open position (illustrated by a solid line) and a fully closed position (illustrated by a dashed line) along a rotational distance greater than a similar adjustment for the adjustable element 426A. That is, the maximum range of travel for the adjustable element 426A between a fully open position (illustrated by a dashed line) and a fully closed position (illustrated by a solid line) can be less than the maximum range of travel for the adjustable element 426B. Conversely, the distance of travel of the adjustable element 426A between fully open and closed positions may be greater than the distance of travel of the adjustable element 426B.

Figure 5:
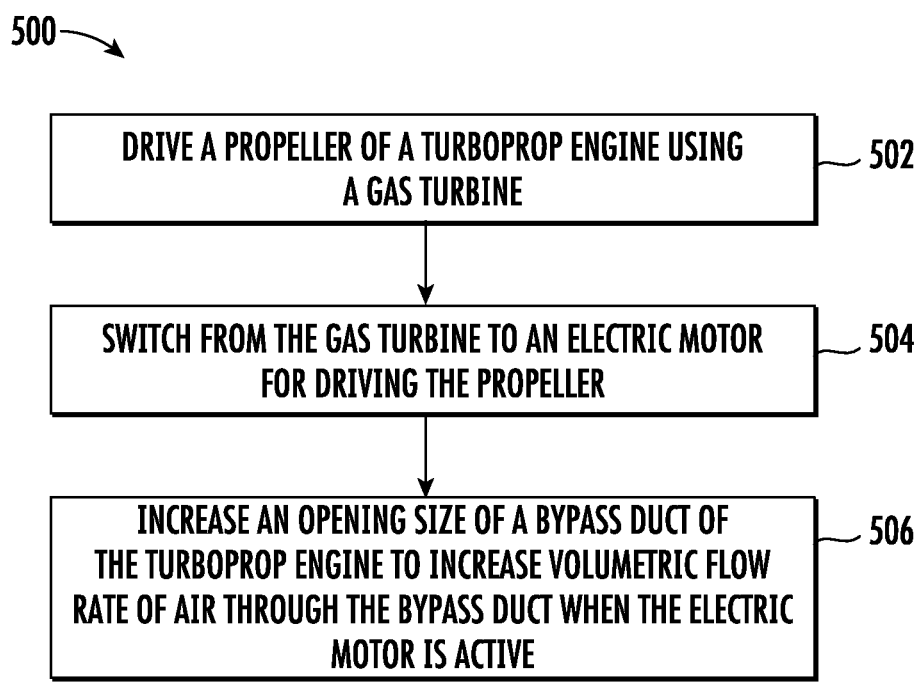
FIG. 5 is a flow chart of a method of using a gas turbine engine in accordance with an exemplary embodiment of the present disclosure.

FIG. 5 illustrates a flowchart of an exemplary method 500 of using a gas turbine engine in accordance with one or more embodiments described herein. The method 500 generally includes a step 502 of driving a propeller of the gas turbine engine using a gas turbine. The method 500 further includes a step 504 of switching from the gas turbine to an electric motor for driving the propeller. In certain instances, the step 504 of switching to the electric motor can be performed manually. In other instances, the step 504 of switching to the electric motor can be performed at least partially autonomously by the gas turbine engine, the vehicle containing the gas turbine engine, or using another controller. For example, when operating at cruising speeds, the gas turbine engine may be automatically switched to at least partial-power generation from the electric motor.

The method 500 can further include a step 506 of increasing an opening size of a bypass duct of the gas turbine engine to increase volumetric flow rate of air through the bypass duct when the electric motor is active. In certain instances, the step 506 of increasing the opening size can be performed manually. In other instances, the step 506 of increasing the opening size can be performed at least in part based on the usage of the electric motor relative to the gas turbine. Increasing the opening size at step 506 may be performed by rotating a rotatable adjustable element in fluid communication with the bypass duct so as to increase an area of the bypass duct. Increasing the opening size at step 506 may also be performed by translating a translatable adjustable element in fluid communication with the bypass duct so as to increase an area of the bypass duct. In some embodiments, increasing the opening size at step 506 may be performed by both rotating and translating an adjustable element in fluid communication with the bypass duct.

In certain instances, the method 500 can further include switching from the electric motor back to the gas turbine for driving the propeller. Accordingly, the method can further include decreasing the opening size of the bypass duct of the gas turbine engine to decrease volumetric flow rate of air through the bypass duct when the electric motor is inactive, or less active.

Figure 6:
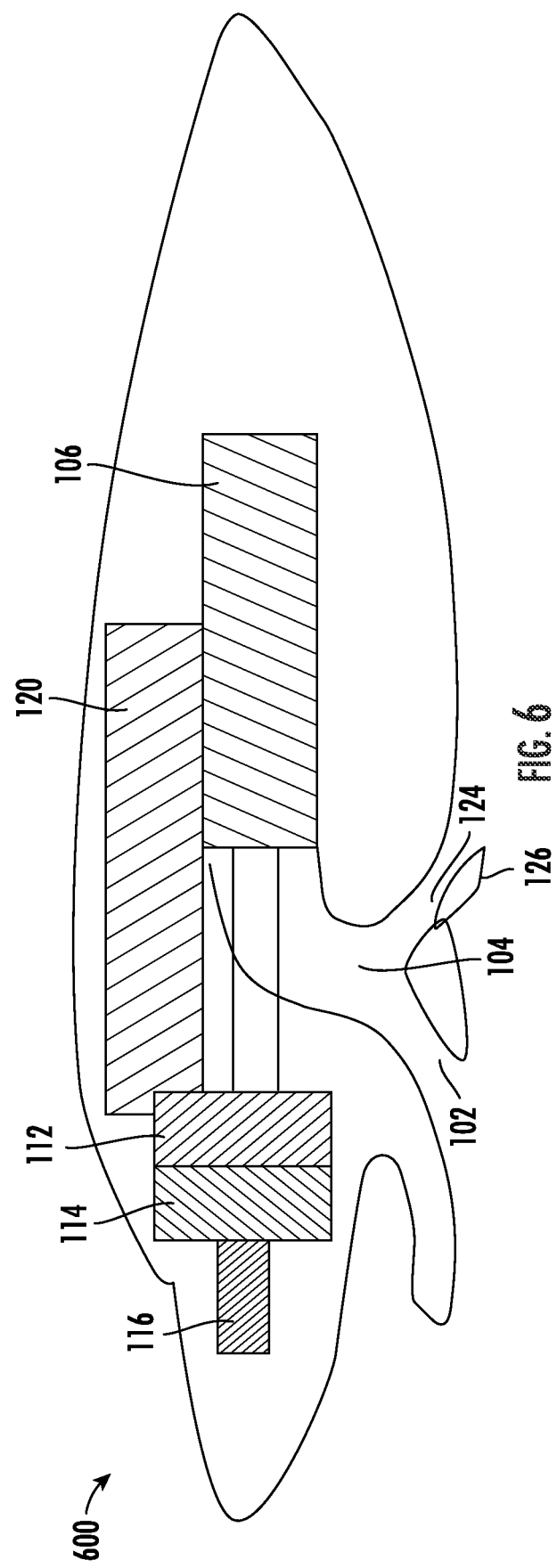
FIG. 6 is a schematic, cross-sectional side view of a gas turbine engine in accordance with an exemplary embodiment of the present disclosure.

The spatial geometry of the gas turbine engine described herein can be altered without materially changing the scope of the present invention. For example, FIG. 6 illustrates a side view of an embodiment of a gas turbine engine 600 where the air inlet 102 is disposed on a lower position, i.e., a 6 o'clock position instead of the 12 o'clock position illustrated, e.g., in FIG. 1. In the illustrated embodiment, the previously described components are generally inverted in their positions relative to the turbomachine 106. For example, the gas turbine engine 600 includes an air passageway 104, a turbomachine 106, a propeller (not shown), a CGB 112, a PGB 114, an electric motor 120, and a bypass duct 124. The propeller is connected to the PGB 114 through downstream drive shaft 116.

The gas turbine engine 600 includes an adjustable element 126 configured to selectively adjust the volumetric fluid flow rate capacity of the bypass duct 124 based on operating parameters, e.g., relative use of the electric motor 120 and/or turbomachine 106. As illustrated, the adjustable element 126 is disposed adjacent to a lower surface of the gas turbine engine 600 as opposed to the gas turbine engine, e.g., gas turbine engine 100, previously described.

Figure 7:
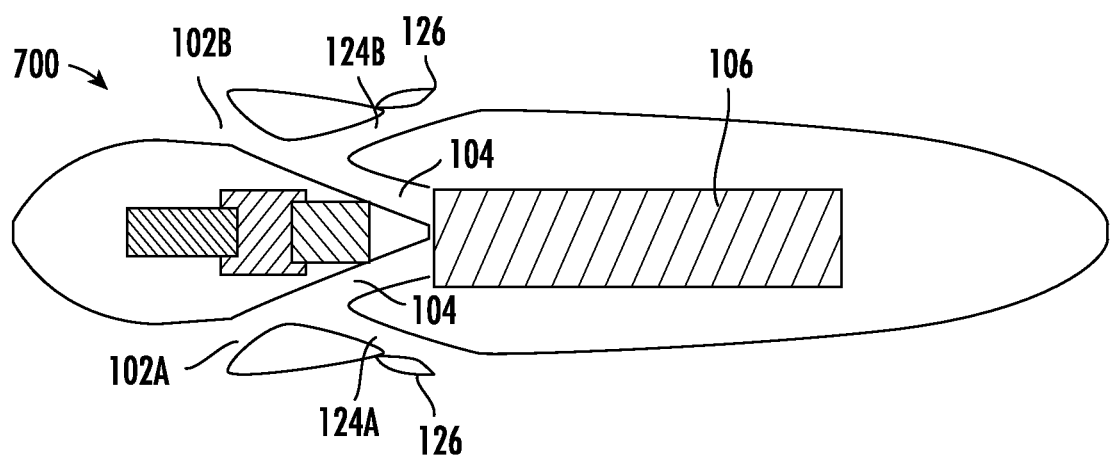
FIG. 7 is a schematic, cross-sectional top view of a gas turbine engine in accordance with an exemplary embodiment of the present disclosure.

FIG. 7 illustrates an exemplary view of a gas turbine engine 700 having a bifurcated air inlet 102. That is, the air inlet 102 includes a first air inlet portion 102A and a second air inlet portion 102B joined together at the air passageway 104. While the air inlets 102A and 102B may be in fluid communication with one another upstream of a bypass duct, in the illustrated embodiments, each air inlet 102A and 102B has a discrete bypass duct 124A and 124B, respectively. The bypass ducts 124A and 124B are shown as starboard and port bypass ducts. In other embodiments, the bypass ducts 124A and 124B can be upper and lower bypass ducts, e.g., rotated 90 degrees about a central axis of the gas turbine engine 700 relative to the starboard and port bypass ducts. At least one of the bypass ducts 124A and 124B can include an adjustable element 126. In a more particular embodiment, both bypass ducts 124A and 124B an include adjustable elements 126. In certain instances, the adjustable elements 126 can be operated in concert with one another. For example, as one of the adjustable elements 126 moves between two or more relative positions, the other of the adjustable elements 126 can move a same, or similar amount. This may be controlled, for example, by a shared logic element or two logic elements in communication with one another, or through, e.g., a shared linkage or motor. In other instances, the adjustable elements 126 may be independently operable. That is, for example, the adjustable element 126 of the bypass duct 124A may operate independently of the adjustable element 126 of the bypass duct 124B. This may be particularly useful during certain aerial maneuvers where airflow properties are different on opposite sides of the gas turbine engine 700.

Figure 8:
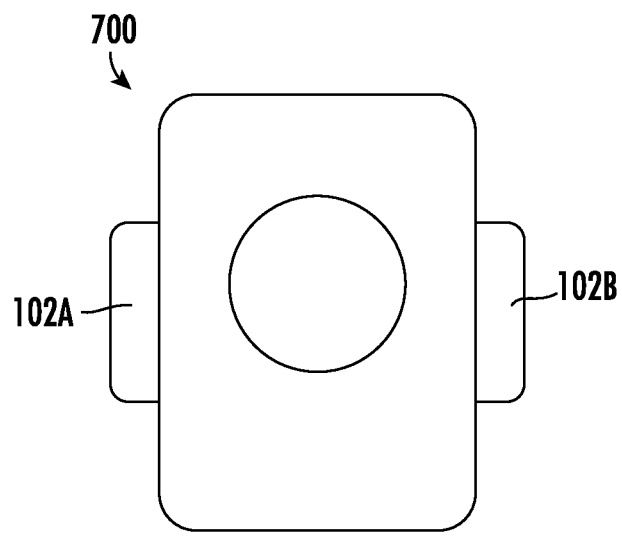
FIG. 8 is a front view of the gas turbine engine of FIG. 7 in accordance with an exemplary embodiment of the present disclosure.

Referring to FIG. 8, the air inlets 102A and 102B may extend outward from the side surfaces of the gas turbine engine 700. In certain instances, the adjustable elements 126, or at least one of the adjustable elements 126, can be seen from a forward view. In other instances, the adjustable elements 126 can be tucked behind a leading assembly such that they are not subjected to impact or damage, or to minimize force necessary to adjust the adjustable element 126.

Figure 9:
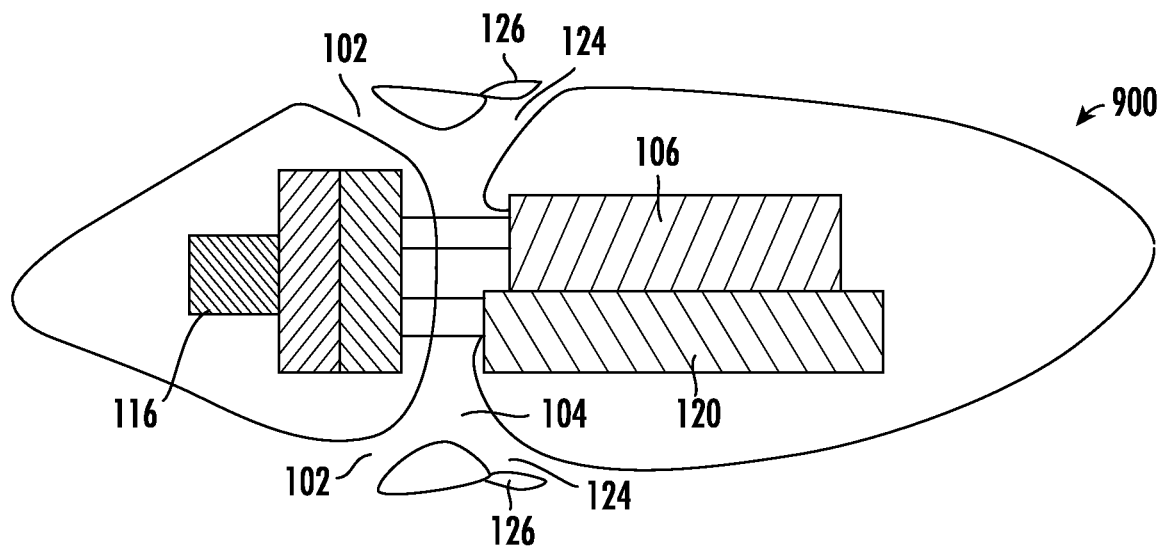
FIG. 9 is a schematic, cross-sectional side view of a gas turbine engine in accordance with an exemplary embodiment of the present disclosure.
Figure 10:
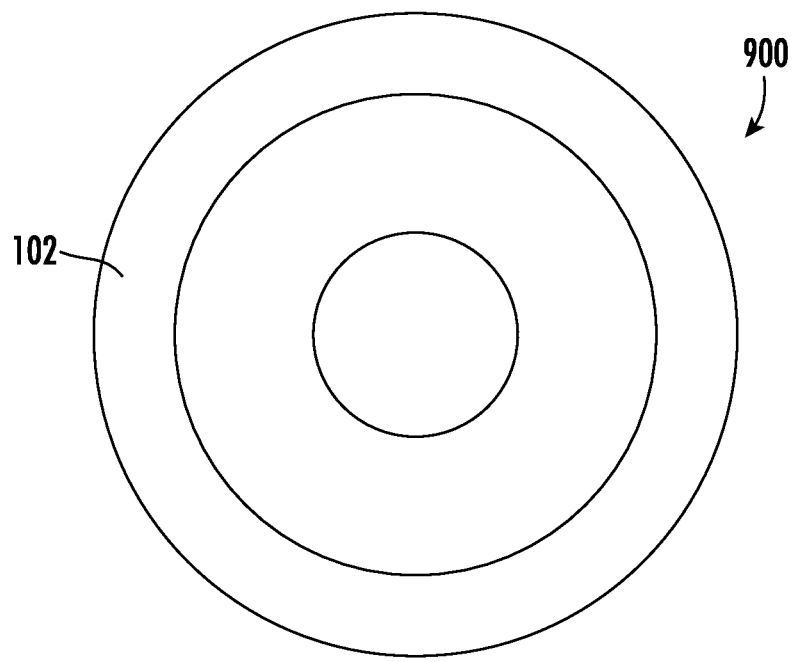
FIG. 10 is a front view of the gas turbine engine of FIG. 9 in accordance with an exemplary embodiment of the present disclosure.

FIG. 9 illustrates an exemplary side view of a gas turbine engine 900 having an annular air inlet 102. That is, the air inlet 102 extends around a circumference of the gas turbine engine 900 as viewed from a front view (FIG. 10). The air inlet 102 can be in fluid communication with a plurality of bypass ducts 124. The plurality of bypass ducts 124 can include, for example, a plurality of discrete bypass ducts 124 which extend through the gas turbine engine 900. At least one of the bypass ducts 124, such as all of the bypass ducts 124, can include an adjustable element 126 configured to control airflow characteristics in a manner as previously described. The adjustable elements 126 can operate together, or independently, in a manner as described herein.

Adjustment of the adjustable element can be performed in progressive stages, or along a progressive continuum that accounts for time delays in ramping up the electric motor and/or gas turbine to full operating conditions. That is, for example, the relative geometry change of the bypass duct can be performed along a transitionary adjustment path such that the relative air needs of the gas turbine are met along each step of activating or deactivating the gas turbine from driving the propeller. In an embodiment, a logic device can be configured to detect and respond to the various conditions of the gas turbine and/or electric motor. In another embodiment, the logic device can be configured to detect, e.g., back pressure within an air passageway of the gas turbine engine. As back pressure increases, for example, the logic device can open the bypass duct by adjusting the adjustable element. In this regard, the logic device can automatically, or at least partially-automatically, reduce the formation of back pressure within the gas turbine engine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

Embodiment 1

A gas turbine engine comprising: a propeller; a turbomachine coupled to the propeller, the turbomachine being in fluid communication with an external environment through an air inlet; and an electric motor coupled to the propeller, wherein the air inlet is in fluid communication with a bypass duct having a selectively variable geometry.

Embodiment 2

The gas turbine engine of any one or more of the embodiments, wherein the bypass duct defines a first fluid volumetric flow rate capability when the electric motor is active and a second fluid volumetric flow rate capability when the electric motor is inactive, and wherein the first fluid volumetric flow rate capability is higher than the second fluid volumetric flow rate capability.

Embodiment 3

The gas turbine engine of any one or more of the embodiments, wherein at least one of the air inlet and bypass duct is configured to mitigate back pressure of the propeller when the propeller is driven at least in part by the electric motor.

Embodiment 4

The gas turbine engine of any one or more of the embodiments, wherein the bypass duct comprises an adjustable element configured to selectively adjust a fluid flow rate of air passing through the bypass duct.

Embodiment 5

The gas turbine engine of any one or more of the embodiments, wherein the adjustable element comprises a rotatable element configured to be rotated between a plurality of positions.

Embodiment 6

The gas turbine engine of any one or more of the embodiments, wherein the adjustable element comprises a translatable element configured to be translated between a plurality of position.

Embodiment 7

A hybrid electric gas turbine engine comprising: an electric motor configured to selectively drive a propeller of the gas turbine engine when a secondary drive element of the hybrid electric gas turbine engine is operating at a reduced capacity; and an adjustable element configured to increase a fluid volumetric flow rate capability of a bypass duct when the electric motor is active.

Embodiment 8

The hybrid electric gas turbine engine of any one or more of the embodiments, wherein the secondary drive element comprises a turbomachine in fluid communication with an external environment through an air inlet, and wherein the turbomachine is in fluid communication with the air inlet upstream of the bypass duct.

Embodiment 9

The hybrid electric gas turbine engine of any one or more of the embodiments, wherein the adjustable element is configured to automatically adjust between two or more positions in response to activation of the electric motor.

Embodiment 10

The hybrid electric gas turbine engine of any one or more of the embodiments, wherein the adjustable element is configured to mitigate back pressure of the propeller is driven at least in part by the electric motor.

Embodiment 11

The hybrid electric gas turbine engine of any one or more of the embodiments, wherein the adjustable element is configured to rotate, translate, or both.

Embodiment 12

A method of using a gas turbine engine, the method comprising: driving a propeller of the gas turbine engine using a turbomachine; switching from the turbomachine to an electric motor for driving the propeller; and increasing an opening size of a bypass duct of the gas turbine engine to increase volumetric flow rate of air through the bypass duct when the electric motor is active.

Embodiment 13

The method of any one or more of the embodiments, wherein increasing the opening size is performed by rotating a rotatable element in fluid communication with the bypass duct so as to increase an area of the bypass duct.

Embodiment 14

The method of any one or more of the embodiments, wherein increasing the opening size is performed by translating a translatable element in fluid communication with the bypass duct so as to increase an area of the bypass duct.

Embodiment 15

The method of any one or more of the embodiments, wherein increasing the opening size is performed automatically in response to switching from the turbomachine to the electric motor.

Embodiment 16

The method of any one or more of the embodiments, wherein increasing the opening size increases a fluid volumetric flow rate capability of the bypass duct.

Embodiment 17

The method of any one or more of the embodiments, wherein increasing the opening size of a bypass duct reduces back pressure within the gas turbine engine upstream of the turbomachine.

Embodiment 18

The method of any one or more of the embodiments, further comprising: switching from the electric motor back to the turbomachine for driving the propeller; and decreasing the opening size of a bypass duct of the gas turbine engine to decrease volumetric flow rate of air through the bypass duct when the electric motor is inactive.

Embodiment 19

The method of any one or more of the embodiments, wherein the gas turbine engine comprises an air inlet in fluid communication with the turbomachine and the bypass duct, and wherein a volumetric flow rate of air entering the air inlet is approximately equal when the propeller is driven by the turbomachine and when the propeller is driven by the electric motor.

Embodiment 20

The method of any one or more of the embodiments, wherein an aerodynamic resistance of the gas turbine engine is not affected by switching from the turbomachine to the electric motor.

What is claimed is:
1. A gas turbine engine comprising:
a propeller;
a turbomachine coupled to the propeller, the turbomachine being in fluid communication with an external environment through an air inlet; and
an electric motor coupled to the propeller,
wherein the air inlet is in fluid communication with a bypass duct having a selectively variable geometry downstream of the propeller,
wherein the bypass duct comprises an adjustable flap configured to selectively adjust a fluid flow rate of air passing through the bypass duct, in which the adjustable flap increases an opening size of the bypass duct automatically in response to switching operation from the turbomachine to the electric motor.

2. The gas turbine engine of claim 1, wherein the bypass duct defines a first fluid volumetric flow rate capability when the electric motor is active and a second fluid volumetric flow rate capability when the electric motor is inactive, and wherein the first fluid volumetric flow rate capability is higher than the second fluid volumetric flow rate capability.

3. The gas turbine engine of claim 1, wherein at least one of the air inlet and bypass duct is configured to mitigate back pressure of the propeller when the propeller is driven at least in part by the electric motor.

4. The gas turbine engine of claim 1, wherein the adjustable flap is configured to be rotated between a plurality of positions.

5. The gas turbine engine of claim 1, wherein the adjustable flap is configured to be translated between a plurality of positions.

6. A hybrid electric gas turbine engine comprising:
a propeller;
an electric motor configured to selectively drive the propeller of the gas turbine engine when a secondary drive element of the hybrid electric gas turbine engine is operating at a reduced capacity; and
a bypass duct comprising an adjustable flap downstream of the propeller configured to increase a fluid volumetric flow rate capability of the bypass duct when the electric motor is active,
wherein the secondary drive element comprises a turbomachine, and
wherein the adjustable flap is configured to increase an opening size of the bypass duct automatically in response to switching operation from the turbomachine to the electric motor.

7. The hybrid electric gas turbine engine of claim 6, wherein the turbomachine is in fluid communication with an external environment through an air inlet, and wherein the turbomachine is in fluid communication with the air inlet upstream of the bypass duct.

8. The hybrid electric gas turbine engine of claim 6, wherein the adjustable flap is configured to automatically adjust between two or more positions in response to activation of the electric motor.

9. The hybrid electric gas turbine engine of claim 6, wherein the adjustable flap is configured to mitigate back pressure of the propeller driven at least in part by the electric motor.

10. The hybrid electric gas turbine engine of claim 6, wherein the adjustable flap is configured to rotate, translate, or both.

11. A method of using a gas turbine engine, the method comprising:
- driving a propeller of the gas turbine engine using a turbomachine;
- switching from the turbomachine to an electric motor for driving the propeller; and
- increasing an opening size of a bypass duct of the gas turbine engine downstream of the propeller to increase volumetric flow rate of air through the bypass duct when the electric motor is active,
- wherein increasing the opening size is performed automatically in response to switching from the turbomachine to the electric motor.

12. The method of claim 11, wherein increasing the opening size is performed by rotating a rotatable flap in fluid communication with the bypass duct so as to increase an area of the bypass duct.

13. The method of claim 11, wherein increasing the opening size is performed by translating a translatable flap in fluid communication with the bypass duct so as to increase an area of the bypass duct.

14. The method of claim 11, wherein increasing the opening size increases a fluid volumetric flow rate capability of the bypass duct.

15. The method of claim 11, wherein increasing the opening size of a bypass duct reduces back pressure within the gas turbine engine upstream of the turbomachine.

16. The method of claim 11, further comprising:
- switching from the electric motor back to the turbomachine for driving the propeller; and
- decreasing the opening size of a bypass duct of the gas turbine engine to decrease volumetric flow rate of air through the bypass duct when the electric motor is inactive.

17. The method of claim 11,
- wherein the gas turbine engine comprises an air inlet in fluid communication with the turbomachine and the bypass duct, and
- wherein a volumetric flow rate of air entering the air inlet is approximately equal when the propeller is driven by the turbomachine and when the propeller is driven by the electric motor.

18. The method of claim 11, wherein an aerodynamic resistance of the gas turbine engine is not affected by switching from the turbomachine to the electric motor.

\* \* \* \* \*